United States Patent [19]

Nix et al.

[11] 4,392,305

[45] Jul. 12, 1983

[54] PENCIL SHAPED MAGNETIC COATING THICKNESS GAUGE

[75] Inventors: Hans Nix; Herbert Szary, both of Cologne, Fed. Rep. of Germany

[73] Assignee: Elektro-Physik Hans Nix & Dr. Ing. E. Steingroever, K.G., Cologne, Fed. Rep. of Germany

[21] Appl. No.: 263,041

[22] Filed: May 12, 1981

[30] Foreign Application Priority Data

Jul. 8, 1980 [DE] Fed. Rep. of Germany ....... 3025783
Jul. 8, 1980 [DE] Fed. Rep. of Germany ... 8018275[U]

[51] Int. Cl.³ .............................................. G01B 7/06
[52] U.S. Cl. ................................... 33/169 F; 324/230
[58] Field of Search ....................... 33/169 F, 169 R; 324/229, 230, 231

[56] References Cited

U.S. PATENT DOCUMENTS

| | | | |
|---|---|---|---|
| 509,096 | 11/1893 | Preston | 33/143 G |
| 2,619,727 | 12/1952 | Krohn | 33/169 B X |
| 2,625,585 | 1/1953 | Krouse | 324/230 X |
| 3,058,225 | 10/1962 | Ward | 33/169 B X |
| 3,559,292 | 2/1971 | Weissman | 33/169 B |

FOREIGN PATENT DOCUMENTS 907721 10/1962 United Kingdom ................ 324/230

*Primary Examiner*—Harry N. Haroian
*Attorney, Agent, or Firm*—Fisher, Christen & Sabol

[57] ABSTRACT

A coating thickness gauge employs a permanent magnet suspended on a coil spring within a pencil shaped housing; the spring being attached to a slide which encircles the housing aid is manually slidable along the length of the housing to adjust the tension of the spring exerted on the magnet. The end of the magnet projects through the end of the housing in contact with a coating deposited on a ferromagnetic base so that the thickness of the coating is measured in terms of the spring tension exerted when the side is moved to pull the magnet away from the coating and this thickness can be read on a scale mounted along the length of the housing. The slide can be provided with internal resilient friction rings or an internal expandable friction element can be placed in the housing to resist inadvertent movement of the slide and an internal stop can be employed to prevent bouncing of the magnet to displace the slide. Several types of indicator or pointer devices can be employed on the slide to facilitate reading the scale.

17 Claims, 6 Drawing Figures

PENCIL SHAPED MAGNETIC COATING THICKNESS GAUGE

BACKGROUND OF THE INVENTION

The present invention concerns a magnetic coating-thickness gauge of small size, resembling a pencil.

In such known coating-thickness gauges as are suitable for use with one hand, the holding magnet or permanent magnet is situated at the lower end of a rod that is connected at its upper end to the opposite end of the housing via a measuring spring. In these known coating-thickness gauges, as a rule the holding magnet with its hemispherically-shaped dome projects from an opening at the lower end of the housing and with the latter is placed on the surface coating to be measured. For the measurement of the thickness of the surface coating of the ferromagnetic support material, the tubular or cartridge-shaped housing of the measuring device is moved upward against the measuring surface or is pulled away from it with the right or left hand until the force of the measuring spring supporting the holding magnet exceeds the holding force of the permanent magnet and the latter is thus abruptly lifted from the measuring surface.

On the rod to which the permanent magnet is attached there is a marking that on lifting of the housing, which is constructed of transparent plastic or is provided with a slit opening moves along the measuring scale, and in order to establish the measured coating thickness, the movement of this marking with respect to the measuring scale must be observed exactly in order to read the position of the marking on the measuring scale as accurately as possible at the moment of separation of the holding magnet from the measuring surface. However, this is associated with great difficulties, for the measuring device with the measuring dome of the holding magnet definitely cannot always be placed on the measuring surface in a constant perpendicular position. However, due to an oblique positioning, the holding force of the magnet on the coating changes, and also the measuring dome is easily unintentionally drawn along the measuring surface, so that from this alone erroneous measurements results. In addition, the particular value measured cannot be stored on the instrument.

Aside from the fact that in kmown measuring devices the exposed measuring dome of the holding magnet can be easily damaged, in these, according to whether measurements are made on measuring surfaces that are horizontal, inclined, or overhead, the addition weight of the support rod for the holding magnet enters into the results of the measurements in such a way as to falsify the measurements read off.

In known coating-thickness gauges with a pencil-shaped housing there is thus not only the varying positioning of the devices on the coating to be measured entailing varying measurements, but it is also extremely difficult to read the position of the mark on the measurement scale exactly at the moment of the sudden separation of the holding magnet from the measuring surface.

SUMMARY OF THE INVENTION

The basic problem of the present invention is to improve a coating-thickness gauge of the type that is suitable for actuation with one hand, in particular to such an extent that simple and reliable measurement storage is possible.

By virtue of the fact that the measuring spring is attached at the opposite end from the holding magnet to a slide that is movably guided axially on the outside of the housing, while placing the device on the coating to be measured with the right or left hand, one can grasp this slide between the index finger and the middle finger and slide in on the housing until the holding magnet separates from the measuring surface in order to instantaneously stop the slide and exactly read the measurement that is stored in accordance with the slide position with respect to the measurement scale. Particularly accurate measurements can be obtained with extremely simple manipulation of the device in accordance with a refinement of the invention by virtue of the fact that the slide is movable under the effect of friction. The friction of the slide in this case exerts no negative influence on the result of the measurement. Rather, during measuring the measuring device stands stationarily on the measuring surface, which not only contributes to increased precision in measurement, but also leads to measurements that can be reproduced at any time. In this device the measuring system is situated completely protected in the housing during the measuring process. In this way, damage to the surface of the holding magnet is avoided, and in addition the measuring spring cannot be overdrawn. Beyond this, sliding of the magnet over the object being measuring during withdrawal is avoided. In this way the measuring site can be maintained exactly and there is no wear on the magnet dome of the holding magnet.

Particularly advantageous refinements of the invention are characterized in one form of the invention wherein expansion of the measuring scale and therewith increased precision of measurement with the device can be obtained if the measuring spring is a pretensioned helical tension spring. For adjustment of the slide with respect to the measuring scale, the measuring spring can also be connected to the slide so as to be adjustable longitudinally. Here the slide encircles the housing like a sleeve or collar and has a striker pin extending radially inward that is guided in a longitudinal slot in the housing and carriers an internally threaded sleeve with a threaded rod for changing the tension of the measuring spring. In order to grasp the slide more securely and enable one-hand use in either measuring direction, the slide has lateral knurls on at least part of its circumference.

On the outside of the housing, parallel to the guide slot for the slide there is arranged a measuring scale that may be situated on a removable scale strip of metal or plastic attached to the outside of the housing, which scale is advantageously secured in a longitudinal groove outside of the guide slot. In this way it is possible to easily adapt the measuring device to the most varied applications by simply changing the measuring scale, for example for various units such as μm , 1/100 mm, mils, or 1/1000 inch.

The reading of the scale in this case can be even further simplified if the slide has at one of its two ends, at least in the reading region, a chambered circumferential collar. However, the slide may also have a reading aperture over the measuring scale, in which case, in a preferred embodiment of the invention a reading loupe with a linear reading mark is mounted in the reading aperture. In another form, the aperture may be formed in the shape of two offset circles, so that the intersection of the circles define a pair of pointers.

In still another variation the friction resistance between the sliding system and the housing may be variably adjusted, such as by the inclusion of a resilient body within the housing which is adjustably compressed against the inner wall by members of a threaded bolt.

In order to prevent slippage of the device and also facilitate the perpendicular positioning in measuring, the opening for the holding magnet at the lower end of the housing may be surrounded with an antislip coating.

BRIEF DESCRIPTION OF THE DRAWINGS

FIG. 4 is a fragmentary side view of a modified form of slide and;

Figure 1:
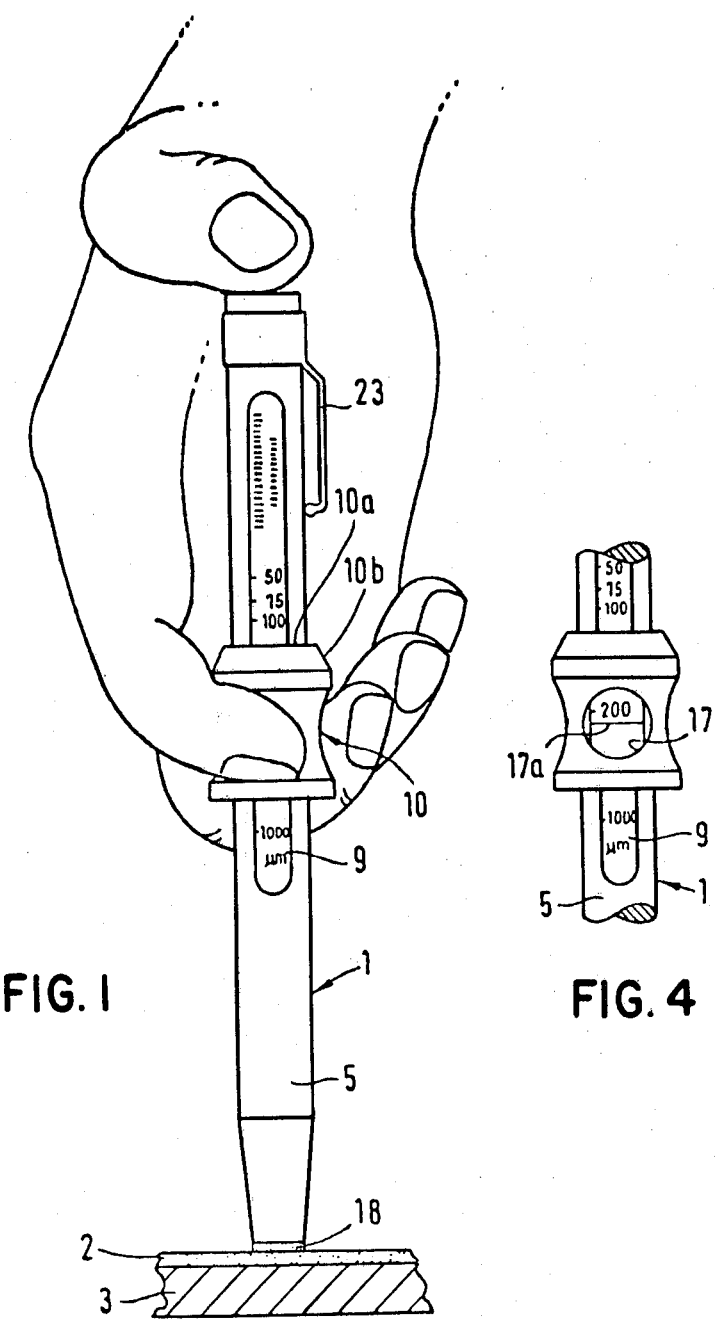
FIG. 1 is a view in elevation of a coating thickness gauge for one-hand operation in accordance with the invention shown in the position to measure the thickness of a coating on a ferromagnetic surface.
Figure 2:
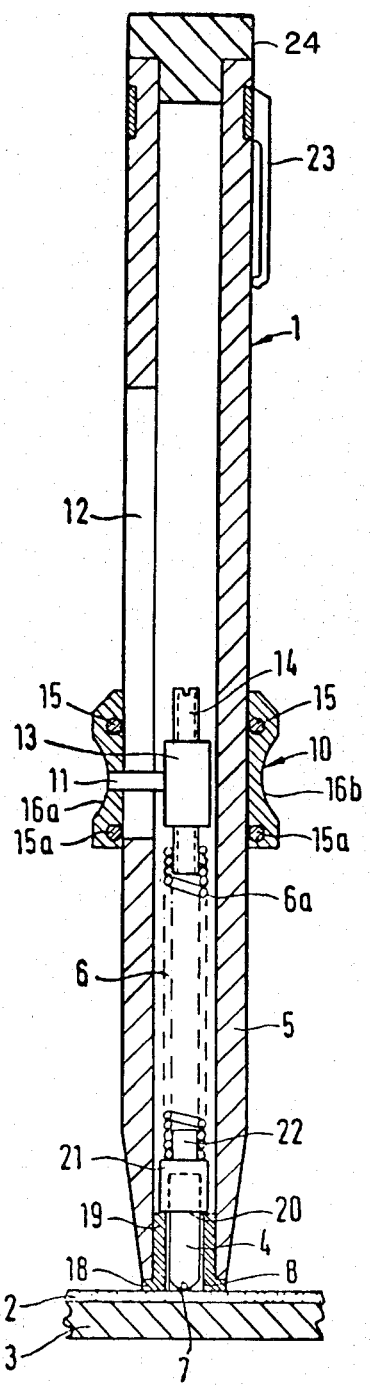
FIG. 2 is a longitudinal section through the measuring device of FIG. 1.
Figure 3:
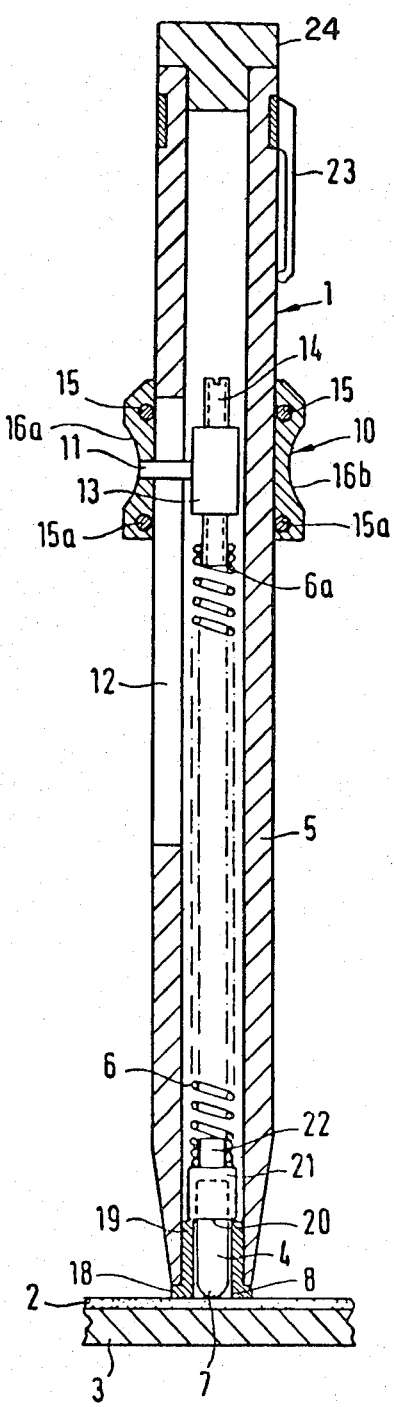
FIG. 3 is a view similar to that of FIG. 2, but at the moment of separation of the magnet from the surface to be measured.

In the case of the embodiment shown in FIGS. 1-3 of the drawing one is dealing with a magnetic coating-thickness gauge having a housing I in the shape of a pencil used for measuring the thickness of a nonmagnetic coating 2 on a ferromagnetic support 3 in accordance with the holding-force principle. In such a coating-thickness gauge the holding force of a permanent magnet on the coating to be measured is a measure of the thickness of the coating. The holding magnet 4 is suspended on a measuring spring 6 in a tubular housing 5 and is situated with its hemispherical magnetic dome 7 in an opening 8 at the lower end of the housing in the measuring position exposed in such a way that in the measuring position shown in FIG. 2 it just comes into contact with the coating 2 to be measured. The magnet itself can have a ground dome, but also a pole of a ferromagnetic material, for example of spherical shape and/or of a material with low saturation magnetization in accordance with DBP No. 21 07 076 and U.S. Pat. No. 3,761,804.

On the housing 5 there is also mounted a measuring scale 9 divided into coating thickness, on which the holding force of the magnet 4 can be read in terms of coating thicknesses.

As can also be seen from the drawing, the measuring spring is connected to a slide 10 at the opposite end 6a from the holding magnet 4, which slide is guided axially movably under the effect of friction on the outside of the housing 1.

The measuring spring 6 is advantageously a pretensioned helical tension spring that is connected with the slide 10 so as to be adjustable longitudinally. The slide is constructed as a sleeve or collar and has a striker pin 11 extending radially inward, which pin is guided in a longitudinal slot 12 in the housing 5 and carries on its inside end an internally threaded sleeve 13 with a threaded rod 14 for changing the tension of the measuring spring 6. A removable cap 24 permits access to the rod.

The slide 10 advantageously consists of a suitable nondeformable plastic and preferably has two internal friction rings 15 and 15a arranged parallel to each other that closely surround the housing 5 and consist of a suitable rubbery elastic material. The slide also has at least two opposing knurls 16a and 16b covering a part of the circumference of the slide, and on the outside of the housing 5, parallel to the guide slot 12 there is situated the measuring scale 9 which is applied to a strip of metal or plastic removably attached to the outside of the housing, which scale may advantageously be inserted in a longitudinal groove parallel to the guide slot 12.

As can be seen in FIG. 1, the slide 10 has at its upper end 10a a chamfered rim 10b serving as a reading mark. However, the slide 10, may also, as shown in FIG. 4, have a reading aperture 17 with a reading mark 17a over the measuring scale 9, in which case, in order to facilitate reading, a reading loupe with a linear reading mark 17a can be mounted in the reading aperture.

Figure 4A:
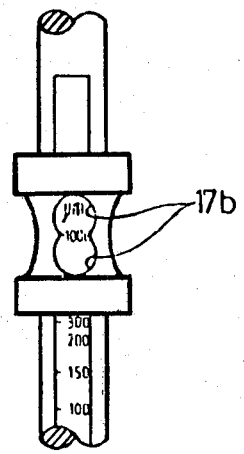
FIG. 4a is a similar view of another modified form of slide.

FIG. 4a illustrates still another form of slide in which the viewing opening is defined by two offset circular openings 17b in the wall of the slide, whereby the two points at which the openings intersect each other define a pair of pointers for reading the scale.

The opening 8 at the lower end of the housing 5 is surrounded by an annular anti-slip coating 18 which is configured as a flange-like rim on a sleeve 19 of rubber or plastic inserted in the housing opening, which simultaneously is configured as a stop for the projecting peripheral rim 20 of the carrier 21 for the holding magnet, which also serves for the attachment of the measuring spring 6 and for this purpose has at the end opposite the holding magnet 4, a pin 22 that is inserted with an exact fit into the lower end of the measuring spring 6.

Figure 3A:
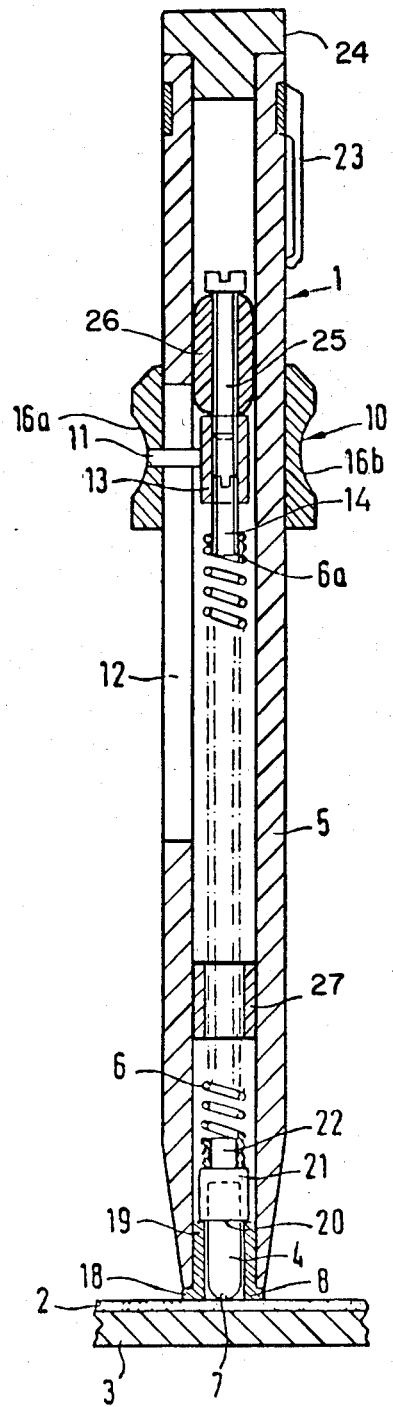
FIG. 3a is a longitudinal section of a modified form of measuring device.

In the measuring device shown in FIG. 3a the frictional engagement between the slide 10 and housing 1 can be adjusted either to suit the convenience of the user or to adjust for wear.

In this case the threaded rod 14 does not project upwardly above the top of the sleeve 13. Instead, a threaded screw 25, having an enlarged head extends downwardly through a bore provided in a friction element 26 of a compressible material, such as a rubber or flexible plastic, having a diameter such that when the screw 25 is threaded into the upper end of sleeve 13 the friction element will be compressed to radially expand to provide any desired amount of friction against the inner wall of the cylinder 5.

A further feature shown in FIG. 3a includes the presence of sleeve 27 which is force-fitted into the interior of housing 5 to act as a stop to limit the upward movement of carrier 21 when the magnet is released from a surface being measured. The presence of the stop prevents the magnet from moving upwardly an amount that would be sufficient to compress the spring 6 and change the position of the reading of the slide on the scale.

For ease in carrying the measuring device, a pocket clip 23 may be attached at the upper end of housing 5.

What we claim is:

1. Magnetic coating-thickness gauge for measuring the thickness of a non-magnetic coating on a ferromagnetic substrate of the type wherein a permanent magnet is suspended by spring means for axial movement within a tubular housing resembling a pencil, said housing being provided with an axially extending slot, the magnet having a pole surface for contact with a coating to be measured on said substrate through an opening at one end of the housing, manually operable slide means encircling the exterior of the housing for slidable movement along the length of the housing in a generally straight line, connecting means extending through said slot between the slide means and spring means to permit the slide means to exert increasing force on said magnet when the slide means is moved away from said one end of the housing to dislodge the magnet from said coating and scale means on said housing with said slide means to denote coating thickness as a function of the force exerted on said magnet, said slide means including friction means engageable with a surface of the housing to hold the slide means in position when released by an operator of the gauge.

2. Coating thickness gauge as defined in claim 1, wherein said friction means includes a ring of resilient material disposed between said slide means and the housing.

3. Coating thickness gauge as defined in claim 1, wherein said connecting means between the slide means and spring means comprises an element extending radially through said slot and movable with said slide means.

4. Coating thickness gauge as defined in claim 3, wherein said element includes a sleeve freely slidable within said housing.

5. Coating thickness gauge as defined in claim 4, wherein said sleeve is threaded to receive a threaded member, said spring means being connected to said threaded member for adjustment of tension.

6. Coating thickness gauge as defined in claim 4, wherein said sleeve is threaded to receive a threaded member extending axially with respect to the housing, and a resilient body is disposed within the housing, said body being provided with a bore through which said threaded member extends, said member having an enlarged head for compressing the resilient body to adjustably frictionally engage the interior wall of the housing.

7. Coating thickness gague as defined in claim 6, wherein another threaded member is received in said sleeve to adjustably connect said spring means to said sleeve.

8. Coating thickness gauge as defined in any one of claims 1, 2, 3, 4, 5, 6 or 7, wherein said spring means comprises a prestressed helical wire spring.

9. Coating thickness gauge as defined in any one of the claims 1, 2, 3, 4, 5, 6 or 7, wherein the interior of said housing is provided with stop means to limit the upward movement of said magnet when pulled away from a coating being measured.

10. Coating thickness gauge as defined in any one of claims 1, 2, 3, 4, 5, 6 or 7 wherein said one end of the housing terminates in an annular flat antislip surface.

11. Coating thickness gauge as defined in any one of claims 3, 4, 5, 6 or 7, wherein said slide means is provided with a radially extending aperture through which said scale means may be viewed.

12. Coating thickness gauge as defined in claim 11, wherein said aperture comprises a pair of axially displaced intersecting circular apertures, the intersections of the circumferences of the apertures defining pointer means.

13. Coating thickness gauge as defined in claim 11, wherein a loupe is disposed in said aperture.

14. Coating thickness gauge as defined in claim 11, wherein at least a portion of the circumference of said slide means is provided with lateral knurls.

15. Coating thickness gauge as defined in claim 11, wherein said scale means is disposed on the exterior of the housing parallel to said slot.

16. Coating thickness gauge as defined in claim 11 wherein said scale means comprises indicia disposed on a separate strip of material to be attached to the exterior of the housing.

17. Coating thickness gauge as defined in claim 11 wherein one end of said slide means is provided with a peripherally chamfered portion at least adjacent the scale means.

* * * * *